(12) United States Patent
Demers et al.

(10) Patent No.: US 12,709,991 B2
(45) Date of Patent: Aug. 18, 2026

(54) CROSSWIND COMPENSATION FOR OUTDOOR TESTING OF TURBOFAN AIRCRAFT ENGINE

(71) Applicant: PRATT & WHITNEY CANADA CORP. (P&WC), Longueuil (CA)

(72) Inventors: Francis Demers, Longueuil (CA); Cristina Crainic, Longueuil (CA)

(73) Assignee: PRATT & WHITNEY CANADA CORP. (P&WC), Longueuil (CA)

( * ) Notice: Subject to any disclaimer, the term of this patent is extended or adjusted under 35 U.S.C. 154(b) by 12 days.

(21) Appl. No.: 18/905,700

(22) Filed: Oct. 3, 2024

(65) Prior Publication Data

US 2026/0098480 A1 Apr. 9, 2026

(51) Int. Cl.
*F01D 21/00* (2006.01)
*F02C 3/04* (2006.01)

(52) U.S. Cl.
CPC .............. *F01D 21/003* (2013.01); *F02C 3/04* (2013.01); *F05D 2220/323* (2013.01); *F05D 2260/80* (2013.01); *F05D 2260/81* (2013.01); *F05D 2260/83* (2013.01)

(58) Field of Classification Search
None
See application file for complete search history.

(56) References Cited

U.S. PATENT DOCUMENTS 9,194,301 B2 11/2015 Parente
2020/0080477 A1 3/2020 Murphy

FOREIGN PATENT DOCUMENTS

| | | | | |
|---|---|---|---|---|
| CA | 3121251 A1 * | 6/2020 | ............ B64U 10/20 |
| CN | 111079232 A * | 4/2020 | |
| CN | 115560984 A * | 1/2023 | ........... G01M 15/02 |
| CN | 117780513 A | 3/2024 | |
| EP | 3153836 A1 | 4/2017 | |

OTHER PUBLICATIONS

European Search Report dated Feb. 10, 2026 issued in corresponding application 25206517.2.
Ahsan Shazaib et al: "Investigation of operational settings, environmental conditions, and faults on the gas turbine performance", Measurement Science and Technology, IOP, Bristol, GB, vol. 35, No. 12, Sep. 17, 2024, pp. 1-18.
Chen Yu-Zhi et al: "An advanced performance-based method for soft and abrupt fault diagnosis of industrial gas turbines", Energy, Elsevier, Amsterdam, NL, vol. 321, Mar. 3, 2025, pp. 1-17.
Soleimani Mohammadjavad et al: "Comprehensive review of gas turbine fault diagnostic strategies", Applied Energy, Elsevier Science, Publishers, GB, vol. 401, Oct. 9, 2025, pp. 1-44.

* cited by examiner

*Primary Examiner* — Rachid Bendidi
*Assistant Examiner* — Nada Mahyoob Alqaderi
(74) *Attorney, Agent, or Firm* — Christopher B. Kilner; MILLEN, WHITE, ZELANO & BRANIGAN, P.C.

(57) ABSTRACT

Systems and methods disclosed herein account for the crosswind effects when assessing the engine field margins based on a run in an outdoor facility where no thrust measurement is available. The impact of crosswinds on engine performance may be quantified by observing the differences in several engine performance parameters available in the field against a performance cycle model reference stored in data tables. The differences are compared to Average New Engine (ANE) margins to result in available margins.

17 Claims, 4 Drawing Sheets

T5
130
LPT
150
HPT
N2
N1
PB
HPC
140 u_out
L P C
120
FAN
ωr
110
u_in
100

200
Input Data
215
Tables
First Tables
Second Tables
210
Interpolation Scheme
220
Jacobian Matrix
230
Components Scaling
ΔηHPC
ΔηHPT
ΔHFAN
250
Delta Values
del_N2
del_ITT
del_PB
234
Inverse Jacobian Solver
240
HPC and HTC Deterioration
ΔηHPC
ΔηHPT
0
262
264
Calculate N2 and ITT Field Margins
270
ITT Field Margins
280

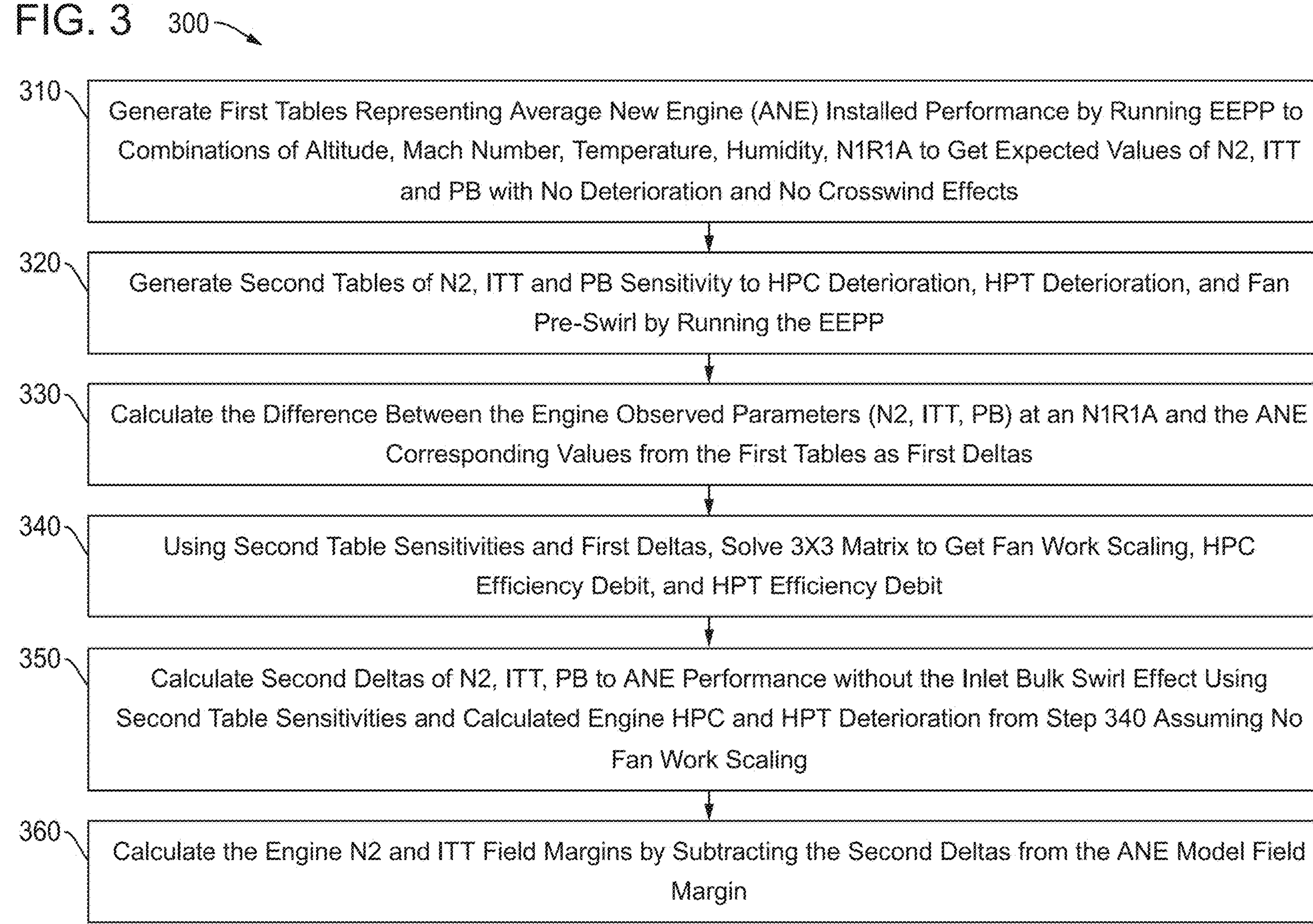
FIG. 3
300
310
Generate First Tables Representing Average New Engine (ANE) Installed Performance by Running EEPP to Combinations of Altitude, Mach Number, Temperature, Humidity, N1R1A to Get Expected Values of N2, ITT and PB with No Deterioration and No Crosswind Effects
320
Generate Second Tables of N2, ITT and PB Sensitivity to HPC Deterioration, HPT Deterioration, and Fan Pre-Swirl by Running the EEPP
330
Calculate the Difference Between the Engine Observed Parameters (N2, ITT, PB) at an N1R1A and the ANE Corresponding Values from the First Tables as First Deltas
340
Using Second Table Sensitivities and First Deltas, Solve 3X3 Matrix to Get Fan Work Scaling, HPC Efficiency Debit, and HPT Efficiency Debit
350
Calculate Second Deltas of N2, ITT, PB to ANE Performance without the Inlet Bulk Swirl Effect Using Second Table Sensitivities and Calculated Engine HPC and HPT Deterioration from Step 340 Assuming No Fan Work Scaling
360
Calculate the Engine N2 and ITT Field Margins by Subtracting the Second Deltas from the ANE Model Field Margin

CROSSWIND COMPENSATION FOR OUTDOOR TESTING OF TURBOFAN AIRCRAFT ENGINE

FIELD OF THE INVENTION

The subject matter disclosed herein relates to testing of turbofan aircraft engines and, in particular, to compensating for crosswind conditions during outdoor power assurance check testing.

BACKGROUND OF THE INVENTION

Turbofan engine development testing requires the measurement of engine inlet conditions (total temperature $T_T$, total pressure $P_T$, Mach number MN) to assess engine performance. In an indoor test cell, uniformity of the inlet flow is achieved through the use of a flow straightener and the proper design of the test section, whereas outdoor test stands can make use of turbulence control structures to improve flow uniformity.

However, when installed on an aircraft, the podded installation of the engine on a customer aircraft or on a flying test bed makes the use of these cumbersome structures impractical. Sufficient instrumentation is therefore used to properly capture the inlet distortion and/or swirl that arises from crosswind and/or aircraft maneuvers, proximity to the ground and/or vortices caused by the surrounding structure. However, typically, only limited instrumentation is available on field engines. Accordingly, the extent of inlet distortion and/or swirl on field engines is largely unknown.

For turbofan engines that do not have a direct measurement of thrust (e.g. an engine pressure ratio (EPR) system), engine health checks (sometimes referred to as Power Assurance Checks) are typically done by comparing the observed engine parameters such as the rotational speed of the high-speed spool (N2) and the indicated turbine temperature (ITT)) at a given low-spool corrected speed (N1R1A) against maximum values (limits) expected for a fully deteriorated engine. The difference between the limit and the observed engine value is referred to as an engine field margin.

It was observed on several occasions that significant scatter may exist in these calculated margins, with large variations sometimes seen between back-to-back checks that ultimately result in inaccurate engine health assessment. This scatter is primarily caused by co-rotating or counter-rotating bulk swirl at the fan inlet, which changes the fan performance at a given low-spool corrected speed (N1 R1A) and therefore alters the relationship between N1 R1A and other engine parameters (e.g. N2 or ITT) for the same engine deterioration level. The magnitude of this inlet bulk swirl depends on the wind speed and direction relative to the aircraft, engine location on the aircraft, proximity of solid structures such as fuselage, walls, etc.

In the past, the approach to circumvent this issue involved attempting to minimize the fan bulk swirl effects either by pointing the aircraft upwind or with forward velocity (end of take-off). These two approaches do not directly address the root cause and have multiple limitations.

The above information disclosed in this Background section is only for understanding of the background of the inventive concepts and, therefore, it may contain information that does not constitute prior art.

SUMMARY OF THE INVENTION

The present disclosure is directed, in a first aspect, to a method of crosswind compensation for an outdoor power assurance check test of a turbofan aircraft engine of an aircraft. The method includes preparing data for engine under test by: generating first tables representing average new engine (ANE) installed performance by running an estimated engine performance program (EEPP) to get expected values of a rotational speed of a high-speed spool (N2), an indicated turbine temperature (ITT), and combustor pressure (PB) with no deterioration and no crosswind effects; generating second tables of sensitivities of N2, ITT, and PB to high-pressure compressor (HPC) deterioration, high-pressure turbine (HPT) deterioration, and fan work scaling by running the EEPP; and storing the first and second tables in a non-transitory storage accessible by an aircraft computer. The method also includes receiving the turbofan aircraft engine's observed parameters of N2, ITT, and PB at an N1 R1A at the aircraft computer, and operating the aircraft computer to perform the power assurance check test of the turbofan aircraft engine. The power assurance check test is performed by: calculating a difference between the engine observed parameters of N2, ITT, and PB at an N1R1A and corresponding ANE values of from the first tables as first deltas ΔN2, ΔITT, and ΔPB; using the sensitivities from the second tables and the first deltas ΔN2, ΔITT, and ΔPB, solving a 3×3 system of equations to get a fan work scaling, an HPC efficiency debit, and an HPT efficiency debit; calculating second deltas ΔN2, ΔITT, and ΔPB to ANE performance without inlet bulk swirl effect using the sensitivities from the second tables and a calculated HPC deterioration and HPT deterioration, without fan work scaling; and calculating engine field margins for N2 and ITT by subtracting the second deltas ΔN2 and ΔITT from ANE field margins as an output for the outdoor power assurance check test.

In an embodiment of the method, generating the first tables may include running the EEPP to a plurality of possible combinations of altitude, Mach number, temperature, humidity, and fan corrected speed N1 R1A to get the expected values of N2, ITT, and PB.

In another embodiment of the method, the EEPP may be a general performance cycle model of the turbofan aircraft engine in a specific configuration on a model of the aircraft.

In a further embodiment of the method, the corresponding ANE values from the first tables may be ANE values interpolated from ambient conditions and the engine observed parameters of N2, ITT, and PB.

In yet another embodiment of the method, the aircraft computer may compare the derived fan work scaling to a predetermined range, and recommend to redirect the aircraft headwind and repeat the outdoor power assurance check test if the derived fan work scaling is out of the predetermined range.

In an embodiment of the method, the aircraft computer may further: activate a brake of the aircraft; close the turbofan aircraft engine bleed system, hydraulic, and electric loads; bring the turbofan aircraft engine to Take-off power; record ambient and engine parameters once the turbofan aircraft engine is stabilized; and bring the turbofan aircraft engine back to idle.

In another embodiment of the method, the aircraft computer may trigger a maintenance action upon a calculated HPC deterioration or a calculated HPT deterioration value exceeding a threshold value.

The present disclosure is also directed, in a second aspect, to a system for crosswind compensation of an outdoor power assurance check test of a turbofan aircraft engine of an aircraft. The system includes a first non-transitory storage medium having stored thereon first tables representing average new engine (ANE) installed performance determined by running an estimated engine performance program (EEPP) to get expected values of a rotational speed of a high-speed spool (N2), an indicated turbine temperature (ITT), and combustor pressure (PB) with no deterioration and no crosswind effects; a second non-transitory storage medium having stored thereon second tables of sensitivities of N2, ITT, and PB to high-pressure compressor (HPC) deterioration, high-pressure turbine (HPT) deterioration, and fan work scaler determined by running the EEPP; an aircraft computer; and aircraft sensors configured to provide parameters of N2, ITT, and PB at an N1 R1A to the aircraft computer. Stored power assurance check test instructions are configured to execute on the aircraft computer to: calculate a difference between the engine observed parameters of N2, ITT, and PB at an N1R1A and corresponding ANE values of from the first tables as first deltas ΔN2, ΔITT, and ΔPB; using the sensitivities from the second tables and the first deltas ΔN2, ΔITT, and ΔPB, solve a 3×3 system of equations to get fan work scaling, an HPC efficiency debit, and an HPT efficiency debit; calculate second deltas ΔN2, ΔITT, and ΔPB to ANE performance without inlet bulk swirl effect using the sensitivities from the second tables and a calculated engine HPC deterioration and HPT deterioration without fan work scaling; and calculate engine field margins for N2 and ITT by subtracting the second deltas ΔN2 and ΔITT from ANE field margins as an output for the outdoor power assurance check test.

In an embodiment of the system, the first tables may include data determined by running the EEPP to a plurality of possible combinations of altitude, Mach number, temperature, humidity, and fan corrected speed N1 R1A to get the expected values of N2, ITT, and PB.

In another embodiment of the system, the EEPP may be a general performance cycle model of the turbofan aircraft engine in a specific configuration on a model of the aircraft.

In a further embodiment of the system, the corresponding ANE values from the first tables may be ANE values interpolated from ambient conditions and the engine observed parameters of N2, ITT, and PB.

In yet another embodiment, the system may further include stored instructions configured to cause the aircraft computer to trigger a maintenance action upon a calculated HPC deterioration or a calculated HPT deterioration value exceeding a threshold value.

In another embodiment, the system may include stored instructions configured to cause the aircraft computer to: compare the derived fan work scaling to a predetermined range, and recommend to redirect the aircraft headwind and repeat the outdoor power assurance check test if the derived fan work scaling is out of the predetermined range.

In a further embodiment, the system may include stored instructions configured to cause the aircraft computer to: activate a brake of the aircraft; close the turbofan aircraft engine bleed system, hydraulic, and electric loads; bring the turbofan aircraft engine to Take-off power; record ambient and engine parameters once the turbofan aircraft engine is stabilized; and bring the turbofan aircraft engine back to idle.

The present disclosure is further directed, in a third aspect, to an aircraft computer for performing an outdoor power assurance check test of a turbofan aircraft engine of an aircraft with crosswind compensation. The aircraft computer includes at least one processor and at least one non-transitory storage medium. The at least one non-transitory storage medium has stored thereon: first tables representing average new engine (ANE) installed performance determined by running an estimated engine performance program (EEPP) to get expected values of a rotational speed of a high-speed spool (N2), an indicated turbine temperature (ITT), and combustor pressure (PB) with no deterioration and no crosswind effects; second tables of sensitivities of N2, ITT, and PB to high-pressure compressor (HPC) deterioration, high-pressure turbine (HPT) deterioration, and fan work scaling determined by running the EEPP; and power assurance check test instructions configured to execute on the at least one processor. The power assurance check test instructions are configured to: calculate a difference between engine observed parameters of N2, ITT, and PB at an N1 R1A and corresponding ANE values of from the first tables as first deltas ΔN2, ΔITT, and ΔPB; using the sensitivities from the second tables and the first deltas ΔN2, ΔITT, and ΔPB, solve a 3×3 system of equations to get fan work scaling, an HPC efficiency debit, and an HPT efficiency debit; calculate second deltas ΔN2, ΔITT, and ΔPB to ANE performance without inlet bulk swirl effect using the sensitivities from the second tables and a calculated engine HPC deterioration and HPT deterioration without fan work scaling; and calculate engine field margins for N2 and ITT by subtracting the second deltas ΔN2 and ΔITT from ANE field margins as an output for the outdoor power assurance check test.

In an embodiment of the aircraft computer, the EEPP may be a general performance cycle model of the turbofan aircraft engine in a specific configuration on a model of the aircraft, and the first tables may include data determined by running the EEPP to a plurality of possible combinations of altitude, Mach number, temperature, humidity, and fan corrected speed N1 R1A to get the expected values of N2, ITT, and PB.

In another embodiment of the aircraft computer, the corresponding ANE values from the first tables may be ANE values interpolated from ambient conditions and the engine observed parameters of N2, ITT, and PB.

In a further embodiment of the aircraft computer, the stored instructions may also be configured to cause the at least one processor to trigger a maintenance action upon a calculated HPC deterioration or a calculated HPT deterioration value exceeding a threshold value.

In yet another embodiment of the aircraft computer, the stored instructions may also be configured to cause the aircraft computer to: compare the derived fan work scaling to a predetermined range, and recommend to redirect the aircraft headwind and repeat the outdoor power assurance check test if the derived fan work scaling is out of the predetermined range.

In a further embodiment of the aircraft computer, the stored instructions may also be configured to cause the aircraft computer to: activate a brake of the aircraft; close the turbofan aircraft engine bleed system, hydraulic, and electric loads; bring the turbofan aircraft engine to Take-off power; record ambient and engine parameters once the turbofan aircraft engine is stabilized; and bring the turbofan aircraft engine back to idle.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

FIG. 3 is a flow diagram of an embodiment of a method in accordance with the present disclosure.

DETAILED DESCRIPTION OF THE INVENTION

Figure 1:
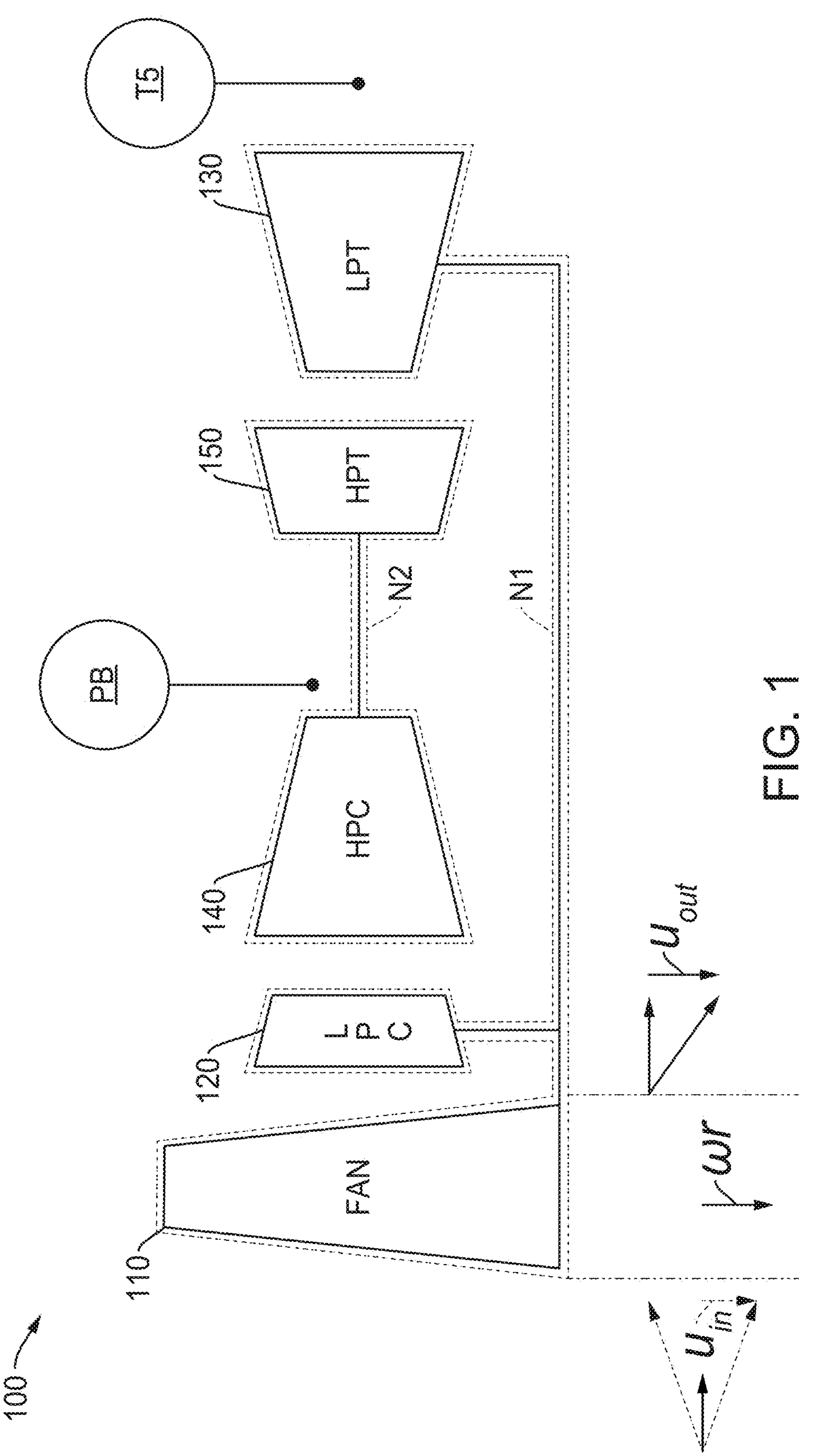
FIG. 1 is a schematic diagram of a control volume of the low-spool energy balance in a turbofan aircraft engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to systems and methods that account for the crosswind effects when assessing the engine field margins based on a run in an outdoor facility where no thrust measurement is available. For example, turbofan engines of an aircraft will typically be tested by performing a power assurance check on the ground after maintenance has been performed on the engine.

Crosswind effects may result in significant bulk swirl (co-rotating or counter-rotating) at the fan inlet. Similar to inlet variable guide vanes, the inlet bulk swirl changes the fan work at a given low-spool corrected speed (N1 R1A) per Euler's equation, which states that the power is equal to the rate of change of angular momentum times the angular velocity. The inlet swirl, thus, changes the fan power of the turbofan engine as depicted by the velocity triangle in FIG. 1.

With reference to FIG. 1, a schematic diagram a turbofan aircraft engine 100 is illustrated that includes of a control volume of the low-spool energy balance within the dotted lines. The low-speed spool operating at rotational speed N1 includes fan 110, low-pressure compressor (LPC) 120, and low-pressure turbine (LPT) 130. The high-speed spool operating at rotational speed N2 includes high-pressure compressor (HPC) 140 and high-pressure turbine (HPT) 150.

Based upon Euler's equation, power equals the rate of change of angular momentum multiplied by the angular velocity, which in the present case may be represented as:

$$\Delta H = \omega r(u_{in} - u_{out}).$$

In accordance with the present disclosure, the impact of inlet bulk swirl (co-rotating or counter-rotating) generated by crosswinds on engine performance may be quantified by observing the differences in several engine performance parameters available in the field against a performance cycle model reference.

In embodiments of the present disclosure, several assumptions are being used. A first assumption is that the fan work at an N1R1A doesn't vary throughout the engine life with fan tip clearance up to the engine maintenance manual limit. Alternatively, fan performance variation over time (due to dirt, erosion, tip clearance increase) may be considered as fairly small and deterministic. Thus, the variation of the fan performance may, for example, be accounted for as x % reduction in flow and pressure ratio over 1,000 cycles.

The second assumption is that the inlet bulk swirl mainly changes the relationship of the rotational speed of the low-speed spool (N1) to the rotational speed of the high-speed spool (N2), i.e., the N1 to N2 relationship, while the exhaust gas temperature (T5), indicated turbine temperature (ITT), combustor pressure (PB) and fuel flow (WF) remain fairly unchanged at a given N2.

The third assumption is that the engine deterioration does change the relationship between N2, T5, ITT, PB, and WF.

In accordance with embodiments of the present disclosure, data from a general performance cycle model for an engine in a particular application, such as Pratt and Whitney's Estimated Engine Performance Program (EEPP), and available measurements are used to derive the shift in fan work driven by the inlet bulk swirl, along with the engine deterioration level. As used herein, the term EEPP will refer to any general performance cycle model for an engine in a particular application.

Figure 2:
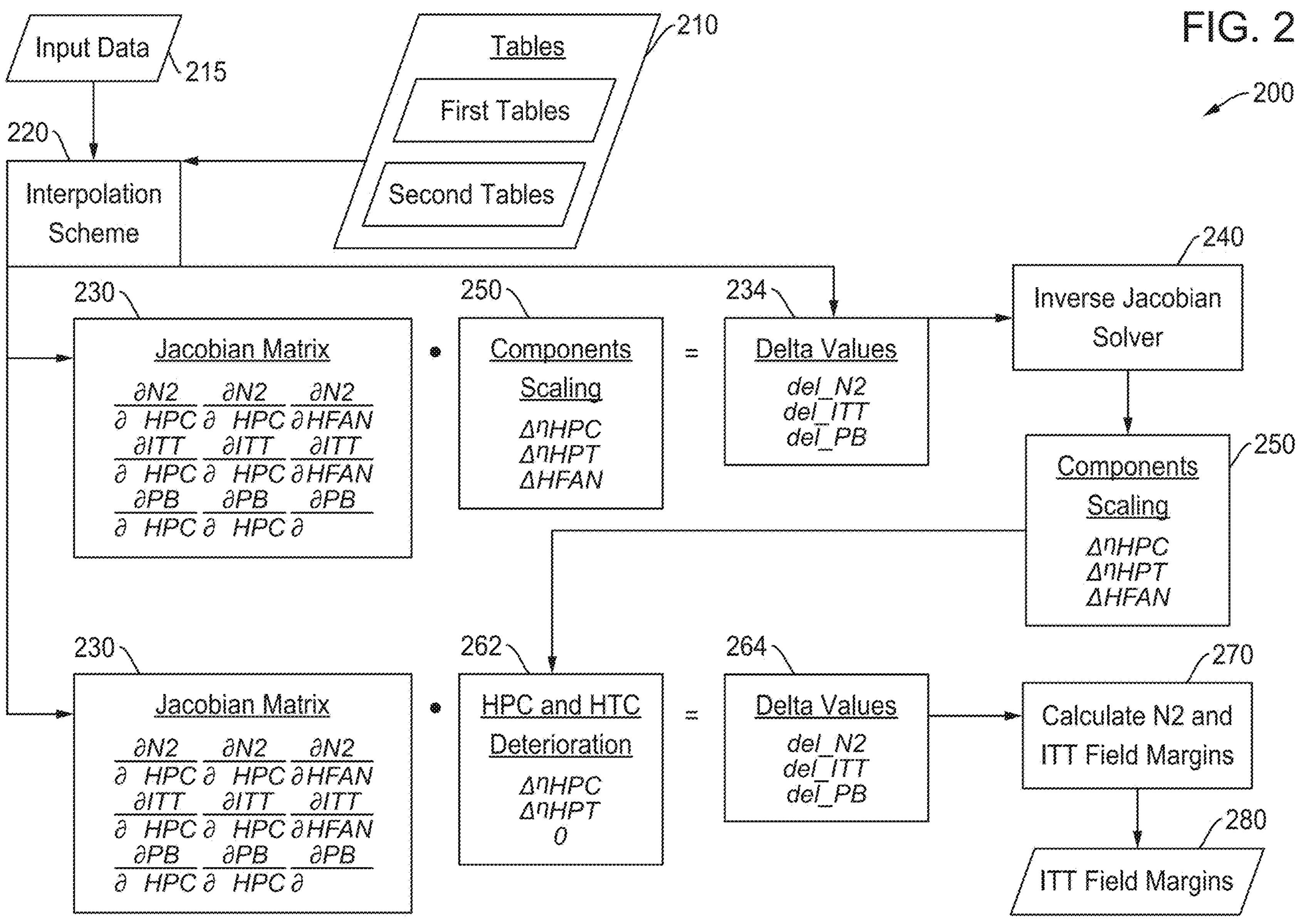
FIG. 2 is a schematic diagram of an embodiment of a simplified solver in accordance with the present disclosure.

An example of such an assessment is depicted in FIG. 2, where it is assumed that the engine deterioration is primarily caused by a loss of efficiency in the high-pressure compressor (HPC) and high-pressure turbine (HPT). The observed deltas (to the EEPP reference) in N2, PB, and ITT at a given fan corrected speed (N1 R1A) are therefore used to calculate the fan work scaling due to bulk swirl, the compressor efficiency deterioration, and the turbine efficiency deterioration.

With reference to FIG. 2, an embodiment of a simplified solver 200 in accordance with the present disclosure is disclosed. The simplified solver may rely upon Average New Engine (ANE) values stored in tables 210 that have been generated by the EEPP for the particular engine under test. For example, first tables representing the ANE installed performance may be generated by running the EEPP to the possible combinations of altitude, Mach number, temperature, humidity, and fan corrected speed N1 R1A to get the expected values of N2, ITT and PB with no deterioration and no crosswind effects. Second tables of N2, ITT and PB sensitivity to HPC deterioration, HPT deterioration, and fan work scaling may also be generated by running the EEPP.

The simplified solver 200 may input data 215 from sensors with ambient conditions (altitude, temperature, and humidity) and engine data (N1, N2, ITT, PB) and use an interpolation scheme 220 to retrieve corresponding ANE values and sensitivities from tables 210 for use by the simplified solver 200.

The simplified solver 200 may then calculate the difference between the engine observed parameters (N2, ITT, PB) at an N1 R1A and the ANE corresponding values from the tables 210 to get the delta values 234.

The sensitivities from the second tables of 210 are used to populate a Jacobian matrix 230 which creates a 3×3 system of equations with the delta values 234 and the components scaling 250 that are the unknowns. The inverse Jacobian solver 240 may calculate the fan work scaling, HPC efficiency debit, and HPT efficiency debit.

The simplified solver 200 may also calculate N2, ITT and PB delta values 264 to ANE performance without the inlet bulk swirl, i.e. using the sensitivities populating Jacobian matrix 230 and the calculated engine HPC and HPT deterioration 262, this time assuming no fan work scaling.

At 270, the simplified solver 200 can calculate the engine N2 and ITT field margins 280 by subtracting the delta N2 and ITT 264 calculated by the simplified solver 200 to the ANE margin 270.

Referring to FIG. 3, one or more embodiment of the present disclosure may be drawn to a method 300 of crosswind compensation for an outdoor power assurance check test of a turbofan aircraft engine.

Method 300 may begin with preparing data for engine under test by, at a step 310, generating first tables representing average new engine (ANE) installed performance by running the EEPP to get expected values of a rotational speed of a high-speed spool (N2), an indicated turbine temperature (ITT), and combustor pressure (PB) with no deterioration and no crosswind effects, and at a step 320, generating second tables of sensitivities of N2, ITT, and PB to high-pressure compressor (HPC) deterioration, high-pressure turbine (HPT) deterioration, and fan work scaling may also be generated by running the EEPP.

In order to generate the first tables representing average new engine (ANE) installed performance, the EEPP may be run to a plurality of possible combinations of altitude, Mach number, temperature, humidity, and fan corrected speed N1 R1A to get the expected values of N2, ITT, and PB. The EEPP should be a general performance cycle model of the turbofan aircraft engine in the specific configuration on the specific model of aircraft under test.

The generated first tables and second tables may be stored in a non-transitory storage accessible by one or more processors. The one or more processors and the non-transitory storage medium may be part of an aircraft computer that is disposed within the aircraft or disposed remote from the aircraft, as discussed further with respect to FIG. 4.

The aircraft computer may also receive the turbofan aircraft engine's observed parameters of N2, ITT, and PB at an N1R1A from various sensors in preparation of performing a power assurance check test on the operating turbofan aircraft engine.

At step 330, the method 300 may use the aircraft computer for calculating a difference between the engine observed parameters of N2, ITT, and PB at an N1 R1A and corresponding ANE values from the first tables as first deltas ΔN2, ΔITT, and ΔPB. The corresponding ANE values from the first tables may be ANE values interpolated from ambient conditions and the engine observed parameters of N2, ITT, and PB. For example, if the first tables do not include values for a particular ambient condition such as temperature, a linear interpolation scheme may be used for between the closest neighboring temperatures to obtain corresponding ANE values.

At a next step 340, using the sensitivities from the second tables and the first deltas ΔN2, ΔITT, and ΔPB, the method 300 may use the aircraft computer for solving the 3×3 system of equations to get a fan work scaling, an HPC efficiency debit, and an HPT efficiency debit. Solving the 3×3 system of equations may use an inverse Jacobian solver.

At a next step 350, the method 300 may use the aircraft computer for calculating second deltas ΔN2, ΔITT, and ΔPB to ANE performance without inlet bulk swirl using the sensitivities from the second tables and a calculated engine HPC deterioration and HPT deterioration without fan work scaling from step 340.

Then, at step 360, the method 300 may use the aircraft computer for calculating engine field margins for N2 and ITT by subtracting the second deltas ΔN2 and ΔITT to the ANE field margins as an output for the outdoor power assurance check test.

In addition to the power assurance check test, the various calculated parameters may be used for additional functions. For example, the aircraft computer may be configured to trigger a maintenance action upon a calculated HPC deterioration or a calculated HPT deterioration value exceeding a threshold value.

Performance of the power assurance check test within method 300 may be done, for example, by an aircraft computer that is remote from an aircraft containing the turbofan aircraft engine or by an aircraft computer that is integral with an aircraft containing the turbofan aircraft engine and implements the aircraft's engine electronic control software.

Figure 4:
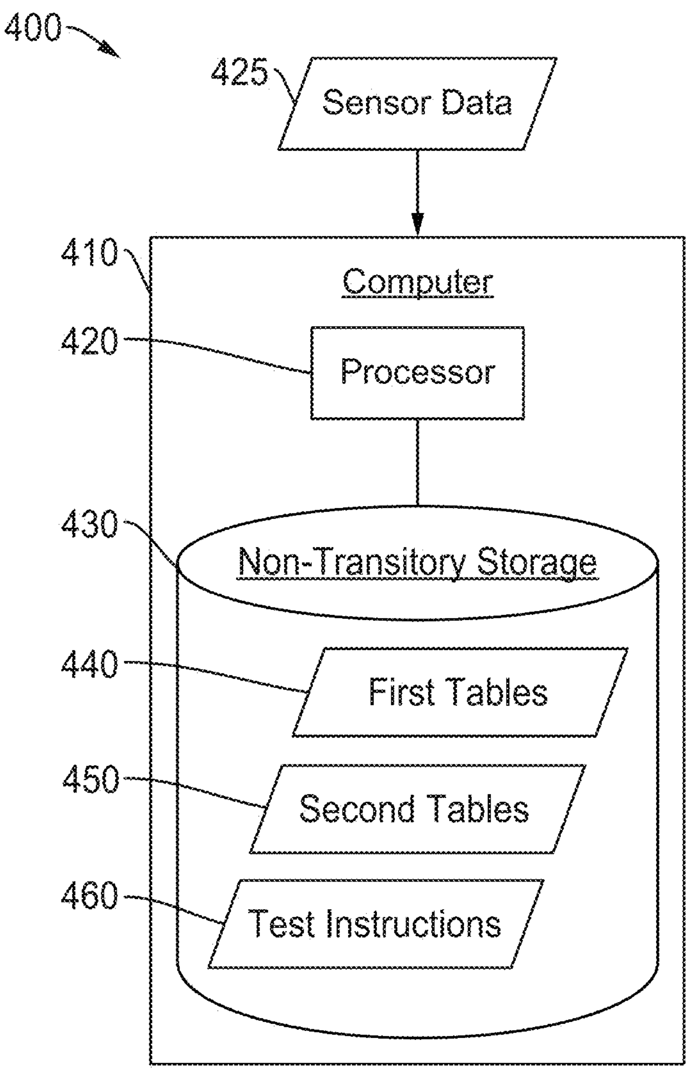
FIG. 4 is a schematic diagram of an apparatus in accordance with an embodiment of the present disclosure.

Referring to FIG. 4, an example embodiment of a system 400 for crosswind compensation of an outdoor power assurance check test of a turbofan aircraft engine is illustrated. The system 400 includes a computer 410 and an input for sensor data 425.

Computer 410 may be, for example, an aircraft computer such as that used for engine electronic control. However, embodiments are not limited thereto and may include general purpose computers, field programmable gate arrays (FPGAs), application specific integrated circuits (ASICs), and the like, which may be disposed within the aircraft or remote from the aircraft.

In the illustrated example, computer 410 includes one or more processors 420 and one or more non-transitory storage 430 devices or mediums. For example, computer 410 may include one or more flash storage modules. However, embodiments of the present disclosure are not limited thereto and non-transitory storage 430 may include magnetic storage (tape, hard disk), optical storage (CD-ROM, DVD-ROM, Blue Ray), EPROMS, RAM, etc.

Thus, in an embodiment, a first non-transitory storage medium of the non-transitory storage 430 may have stored thereon first tables 440 representing average new engine (ANE) installed performance determined by running an estimated engine performance program (EEPP) to get expected values of a rotational speed of a high-speed spool (N2), an indicated turbine temperature (ITT), and combustor pressure (PB) with no deterioration and no crosswind effects. The first tables include, for example, data that may be determined by running the EEPP to a plurality of possible combinations of altitude, Mach number, temperature, humidity, and fan corrected speed N1 R1A to get the expected values of N2, ITT, and PB.

An embodiment of the non-transitory storage 430 may further include a second non-transitory storage medium having stored thereon second tables 450 of sensitivities of N2, ITT, and PB to high-pressure compressor (HPC) deterioration, high-pressure turbine (HPT) deterioration, and fan work scaling determined by running the EEPP.

Aircraft sensors may be configured to provide parameters of N2, ITT, and PB at an N1 R1A to the aircraft computer as sensor data 425 input for use in the power assurance check test.

An embodiment of the non-transitory storage 430 may further include stored power assurance check test instructions 460 configured to execute on the aircraft computer. When executed, the test instructions 460 may be used to cause one or more processors 420 to begin performance of the test by activating the aircraft brake, close the engine bleed system, hydraulic, and electric loads, bring one engine to Take-off power, record ambient and engine parameters once stabilized, and bring the engine back to idle.

With the recorded parameters, the test instructions 460 may cause the processor(s) 420 to: calculate a difference between the engine observed parameters of N2, ITT, and PB at an N1 R1A and corresponding ANE values from the first tables as first deltas ΔN2, ΔITT, and ΔPB; using the sensitivities from the second tables and the first deltas ΔN2, ΔITT, and ΔPB, solve a 3×3 system of equations to get fan work scaling, an HPC efficiency debit, and an HPT efficiency debit; calculate second deltas ΔN2, ΔITT, and ΔPB to ANE performance without inlet bulk swirl effect using the sensitivities from the second tables and a calculated engine HPC deterioration and HPT deterioration; and calculate engine field margins for N2 and ITT by subtracting the second deltas ΔN2 and ΔITT to the ANE field margins as an output for the outdoor power assurance check test.

In one or more embodiment, the non-transitory storage 430 may further include stored instructions configured to cause the computer 410 to trigger a maintenance action upon a calculated HPC deterioration or a calculated HPT deterioration value exceeding a threshold value.

In various embodiments, the computer 410 may be an aircraft computer that is remote from an aircraft containing the turbofan aircraft engine or an aircraft computer that is integral with an aircraft containing the turbofan aircraft engine and implements the aircraft's engine electronic control software.

Indeed, one or more embodiments of the present disclosure may be drawn to an aircraft computer for performing an outdoor power assurance check test of a turbofan aircraft engine with crosswind compensation. The aircraft computer may include at least one processor 420 and at least one non-transitory storage medium 430 having stored thereon: first tables 440 representing average new engine (ANE) installed performance determined by running an estimated engine performance program (EEPP) to get expected values of a rotational speed of a high-speed spool (N2), an indicated turbine temperature (ITT), and combustor pressure (PB) with no deterioration and no crosswind effects.

In an embodiment, the EEPP may be a general performance cycle model of the turbofan aircraft engine in a specific configuration on a model of aircraft, and the first tables 440 may include data determined by running the EEPP to a plurality of possible combinations of altitude, Mach number, temperature, humidity, and fan corrected speed N1 R1A to get the expected values of N2, ITT, and PB.

The aircraft computer may also include the at least one non-transitory storage medium 430 having stored thereon second tables 450 of sensitivities of N2, ITT, and PB to high-pressure compressor (HPC) deterioration, high-pressure turbine (HPT) deterioration, and fan work scaling determined by running the EEPP.

The at least one non-transitory storage medium 430 of the aircraft computer may further include power assurance check test instructions 460 configured to execute on processor(s) 420. When executed, the test instructions 460 may be used to cause one or more processors 420 to begin performance of the test by activating the aircraft brake, close the engine bleed system, hydraulic, and electric loads, bring one engine to Take-off power, record ambient and engine parameters once stabilized, and bring the engine back to idle.

With the recorded parameters, the test instructions 460 configured to execute on the at least one processor 420 may: calculate a difference between engine observed parameters of N2, ITT, and PB at an N1 R1A and corresponding ANE values of from the first tables 440 as first deltas ΔN2, ΔITT, and ΔPB; using the sensitivities from the second tables 450 and the first deltas ΔN2, ΔITT, and ΔPB, solve a 3×3 system of equations to get a fan work scaling, an HPC efficiency debit, and an HPT efficiency debit; calculate second deltas ΔN2, ΔITT, and ΔPB to ANE performance without inlet bulk swirl effect using the sensitivities from the second tables 450 and a calculated HPC deterioration and HPT deterioration without fan work scaling; and calculate engine field margins for N2 and ITT by subtracting the second deltas ΔN2 and ΔITT to ANE field margins as an output for the outdoor power assurance check test.

In one or more embodiments, the corresponding ANE values from the first tables 440 may include ANE values interpolated from ambient conditions and the engine observed parameters of N2, ITT, and PB received in sensor data 425.

In various embodiments, the stored test instructions 460 may be configured to cause the at least one processor to trigger a maintenance action upon a calculated HPC deterioration or a calculated HPT deterioration value exceeding a threshold value.

In one or more embodiments, the stored test instructions 460 may be configured to recommend to redirect the aircraft headwind and repeat the outdoor power assurance check test if the derived fan work scaling is out of a predetermined range.

This methodology is easy to implement, simple to update by regenerating the first and second tables 440 and 450 and takes very little processing power and time to solve. Therefore, it could be directly implemented in the engine electronic control software to automate the power assurance check or loaded to an APP (digital twin), or web base portal (remote).

Furthermore, as discussed above, additional logic can be added to the solver to trigger maintenance actions. For instance, the solver could recommend compressor wash if the calculated HPC deterioration exceeds a certain threshold, or verify the aircraft bleed system if the first deltas indicate a bleed leakage.

Previously, trend monitoring of field engine performance required the use of rolling average to capture performance shift due of the high scatter. With the approach to data reduction in accordance with the present disclosure, a performance shift can be captured at the first trend point, which would allow for a quicker response.

Furthermore, outdoor development testing could be more cost-effective as it allows for a simpler set-up where less instrumentation and turbulence control structure could be used.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A method of crosswind compensation for an outdoor power assurance check test of a turbofan aircraft engine of an aircraft, comprising:

preparing data for engine under test by:

generating first tables representing average new engine (ANE) installed performance by running an estimated engine performance program (EEPP) to get expected values of a rotational speed of a high-speed spool (N2), an indicated turbine temperature (ITT), and combustor pressure (PB) with no deterioration and no crosswind effects;

generating second tables of sensitivities of N2, ITT, and PB to high-pressure compressor (HPC) deterioration, high-pressure turbine (HPT) deterioration, and fan work scaling by running the EEPP;

storing the first and second tables in a non-transitory storage accessible by an aircraft computer;

receiving the turbofan aircraft engine observed parameters of N2, ITT, and PB at an N1R1A at the aircraft computer by operating the aircraft computer to perform the power assurance check test of the turbofan aircraft engine by:

activating a brake of the aircraft;

closing the turbofan aircraft engine bleed system, hydraulic, and electric loads;

bringing the turbofan aircraft engine to Take-off power;

recording ambient parameters and the engine observed parameters once the turbofan aircraft engine is stabilized; and bringing the turbofan aircraft engine back to idle;

calculating a difference between the engine observed parameters of N2, ITT, and PB at the N1R1A and corresponding ANE values of from the first tables as first deltas ΔN2, ΔITT, and ΔPB;

using the sensitivities from the second tables and the first deltas ΔN2, ΔITT, and ΔPB, solving a 3×3 system of equations to get a fan work scaling, an HPC efficiency debit, and an HPT efficiency debit;

calculating second deltas ΔN2, ΔITT, and ΔPB to ΔNE performance without inlet bulk swirl effect using the sensitivities from the second tables and a calculated HPC deterioration and HPT deterioration, without fan work scaling; and calculating engine field margins for N2 and ITT by subtracting the second deltas ΔN2 and ΔITT from ΔNE field margins as an output for the outdoor power assurance check test.

2. The method of claim 1, wherein generating the first tables includes running the EEPP to a plurality of possible combinations of altitude, Mach number, temperature, humidity, and fan corrected speed N1R1A to get the expected values of N2, ITT, and PB.

3. The method of claim 1, wherein the EEPP is a general performance cycle model of the turbofan aircraft engine in a specific configuration on a model of the aircraft.

4. The method of claim 2, wherein the corresponding ΔNE values from the first tables are ΔNE values interpolated from ambient conditions and the engine observed parameters of N2, ITT, and PB.

5. The method of claim 1, wherein the aircraft computer compares the derived fan work scaling to a predetermined range, and recommends to redirect the aircraft headwind and repeat the outdoor power assurance check test if the derived fan work scaling is out of the predetermined range.

6. The method of claim 1, further comprising the aircraft computer triggering a maintenance action upon a calculated HPC deterioration or a calculated HPT deterioration value exceeding a threshold value.

7. A system for crosswind compensation of an outdoor power assurance check test of a turbofan aircraft engine of an aircraft, comprising:

a first non-transitory storage medium having stored thereon first tables representing average new engine (ΔNE) installed performance determined by running an estimated engine performance program (EEPP) to get expected values of a rotational speed of a high-speed spool (N2), an indicated turbine temperature (ITT), and combustor pressure (PB) with no deterioration and no crosswind effects;

a second non-transitory storage medium having stored thereon second tables of sensitivities of N2, ITT, and PB to high-pressure compressor (HPC) deterioration, high-pressure turbine (HPT) deterioration, and fan work scaler determined by running the EEPP;

an aircraft computer;

aircraft sensors configured to provide engine parameters of N2, ITT, and PB at an N1R1A to the aircraft computer;

stored power assurance check test instructions configured to execute on the aircraft computer to:

activate a brake of the aircraft;

close the turbofan aircraft engine bleed system, hydraulic, and electric loads;

bring the turbofan aircraft engine to Take-off power;

record ambient and the engine parameters of N2, ITT, and PB at the N1R1A once the turbofan aircraft engine is stabilized;

bring the turbofan aircraft engine back to idle;

calculate a difference between the engine observed engine parameters of N2, ITT, and PB at the N1R1A and corresponding ΔNE values of from the first tables as first deltas ΔN2, ΔITT, and ΔPB;

using the sensitivities from the second tables and the first deltas ΔN2, ΔITT, and ΔPB, solve a 3×3 system of equations to get fan work scaling, an HPC efficiency debit, and an HPT efficiency debit;

calculate second deltas ΔN2, ΔITT, and ΔPB to ΔNE performance without inlet bulk swirl effect using the sensitivities from the second tables and a calculated engine HPC deterioration and HPT deterioration without fan work scaling; and calculate engine field margins for N2 and ITT by subtracting the second deltas ΔN2 and ΔITT from ΔNE field margins as an output for the outdoor power assurance check test.

8. The system of claim 7, wherein the first tables include data determined by running the EEPP to a plurality of possible combinations of altitude, Mach number, temperature, humidity, and fan corrected speed N1R1A to get the expected values of N2, ITT, and PB.

9. The system of claim 7, wherein the EEPP is a general performance cycle model of the turbofan aircraft engine in a specific configuration on a model of the aircraft.

10. The system of claim 7, wherein the corresponding ΔNE values from the first tables are ΔNE values interpolated from ambient conditions and the engine observed parameters of N2, ITT, and PB.

11. The system of claim 7, further comprising stored instructions configured to cause the aircraft computer to trigger a maintenance action upon a calculated HPC deterioration or a calculated HPT deterioration value exceeding a threshold value.

12. The system of claim 7, further comprising stored instructions configured to cause the aircraft computer to:

compare the derived fan work scaling to a predetermined range, and recommend to redirect the aircraft headwind and repeat the outdoor power assurance check test if the derived fan work scaling is out of the predetermined range.

13. An aircraft computer for performing an outdoor power assurance check test of a turbofan aircraft engine of an aircraft with crosswind compensation, comprising:

at least one processor;

at least one non-transitory storage medium having stored thereon:

first tables representing average new engine (ΔNE) installed performance determined by running an estimated engine performance program (EEPP) to get expected values of a rotational speed of a high-speed spool (N2), an indicated turbine temperature (ITT), and combustor pressure (PB) with no deterioration and no crosswind effects;

second tables of sensitivities of N2, ITT, and PB to high-pressure compressor (HPC) deterioration, high-pressure turbine (HPT) deterioration, and fan work scaling determined by running the EEPP; and power assurance check test instructions configured to execute on the at least one processor to:

activate a brake of the aircraft;

close the turbofan aircraft engine bleed system, hydraulic, and electric loads;

bring the turbofan aircraft engine to Take-off power;

record ambient and engine observed parameters of N2, ITT, and PB at an N1R1A once the turbofan aircraft engine is stabilized;

bring the turbofan aircraft engine back to idle;

calculate a difference between the engine observed parameters of N2, ITT, and PB at the N1R1A and corresponding ΔNE values of from the first tables as first deltas ΔN2, ΔITT, and ΔPB;

using the sensitivities from the second tables and the first deltas ΔN2, ΔITT, and ΔPB, solve a 3×3 system of equations to get fan work scaling, an HPC efficiency debit, and an HPT efficiency debit;

calculate second deltas ΔN2, ΔITT, and ΔPB to ΔNE performance without inlet bulk swirl effect using the sensitivities from the second tables and a calculated engine HPC deterioration and HPT deterioration without fan work scaling; and calculate engine field margins for N2 and ITT by subtracting the second deltas ΔN2 and ΔITT from ΔNE field margins as an output for the outdoor power assurance check test.

14. The aircraft computer of claim 13, wherein the EEPP is a general performance cycle model of the turbofan aircraft engine in a specific configuration on a model of the aircraft, and wherein the first tables include data determined by running the EEPP to a plurality of possible combinations of altitude, Mach number, temperature, humidity, and fan corrected speed N1R1A to get the expected values of N2, ITT, and PB.

15. The aircraft computer of claim 13, wherein the corresponding ΔNE values from the first tables are ΔNE values interpolated from ambient conditions and the engine observed parameters of N2, ITT, and PB.

16. The aircraft computer of claim 13, further comprising stored instructions configured to cause the at least one processor to trigger a maintenance action upon a calculated HPC deterioration or a calculated HPT deterioration value exceeding a threshold value.

17. The aircraft computer of claim 13, further comprising stored instructions configured to cause the aircraft computer to:

compare the derived fan work scaling to a predetermined range, and recommend to redirect the aircraft headwind and repeat the outdoor power assurance check test if the derived fan work scaling is out of the predetermined range.

* * * * *